US012584585B2

(12) United States Patent
Williams et al.

(10) Patent No.: US 12,584,585 B2
(45) Date of Patent: Mar. 24, 2026

(54) ADJUSTABLE MIRROR INSTALLATION DEVICE

(71) Applicant: Precision Frameworks LLC, Tucker, GA (US)

(72) Inventors: Jess Richard Williams, Atlanta, GA (US); Joshua Robert Williams, Atlanta, GA (US); Jacob Michael Williams, Atlanta, GA (US)

(73) Assignee: PRECISION FRAMEWORKS, LLC, Tucker, GA (US)

( * ) Notice: Subject to any disclaimer, the term of this patent is extended or adjusted under 35 U.S.C. 154(b) by 0 days.

(21) Appl. No.: 18/882,101

(22) Filed: Sep. 11, 2024

(65) Prior Publication Data

US 2025/0084952 A1 Mar. 13, 2025

Related U.S. Application Data

(60) Provisional application No. 63/582,030, filed on Sep. 12, 2023.

(51) Int. Cl.
B25H 7/04 (2006.01)
F16M 11/04 (2006.01)
G02B 7/182 (2021.01)

(52) U.S. Cl.
CPC ............. F16M 11/04 (2013.01); G02B 7/182 (2013.01); F16M 2200/022 (2013.01)

(58) Field of Classification Search
CPC .. F16M 11/04; F16M 2200/022; F16M 13/02; G02B 7/182; G01C 9/24
See application file for complete search history.

(56) References Cited

U.S. PATENT DOCUMENTS 1,107,686 A * 8/1914 Mehrmann ............... A47G 1/16
248/495
2,952,431 A * 9/1960 Pedley ................. A47G 1/1626
40/713

(Continued)

FOREIGN PATENT DOCUMENTS

WO 2019017766 A1 1/2019

OTHER PUBLICATIONS

International Search Report for International Application No. PCT/US2024/046145 of Jan. 21, 2025.

(Continued)

*Primary Examiner* — Amy J. Sterling
(74) *Attorney, Agent, or Firm* — Perilla Knox & Hildebrandt LLP; Kenneth A. Knox

(57) ABSTRACT

An adjustable installation device for hanging objects on vertical structures is described. In one example, an adjustable installation device includes a body section having a first track member slidably positioned within a second track member, a foot section coupled to the second track member, and a head section rotatably coupled to the first track member at a pivot point. The head section is at least partly rotatable about the pivot point and includes plates extending from an end of the head section, guide holes formed through the plates on a common centerline that extends through a center of each of the guide holes, and an alignment device operable to align the common centerline with a defined plane. The first and second track members are collectively operable to slide the foot and head sections in opposite linear directions to adjust a distance between the foot section and the common centerline.

14 Claims, 7 Drawing Sheets

(56)                      References Cited

U.S. PATENT DOCUMENTS

| | | | |
|---|---|---|---|
| 4,455,756 | A | 6/1984 | Greene |
| 6,003,825 | A * | 12/1999 | Abernathy, Jr. ....... A47G 1/164 |
| | | | 248/478 |
| 10,683,670 | B1 * | 6/2020 | Rush ........................ E04F 21/18 |
| 2009/0045315 | A1 | 2/2009 | Harralson et al. |
| 2012/0298830 | A1 | 11/2012 | Reschke |
| 2018/0178364 | A1 | 6/2018 | Bruno |

OTHER PUBLICATIONS

Written Opinion for International Application No. PCT/US2024/046145 of Jan. 21, 2025.

* cited by examiner

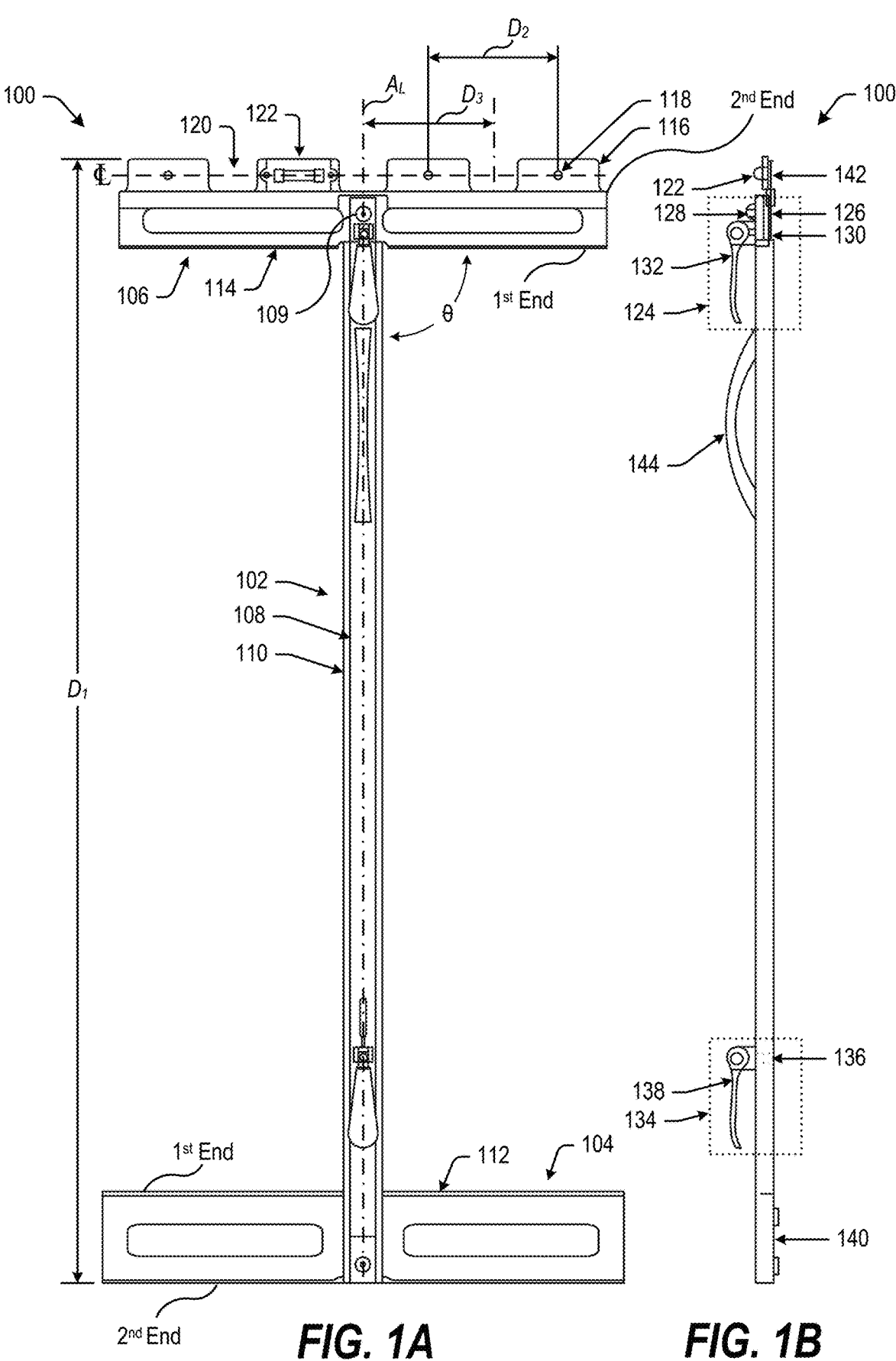
*FIG. 1A*        *FIG. 1B*

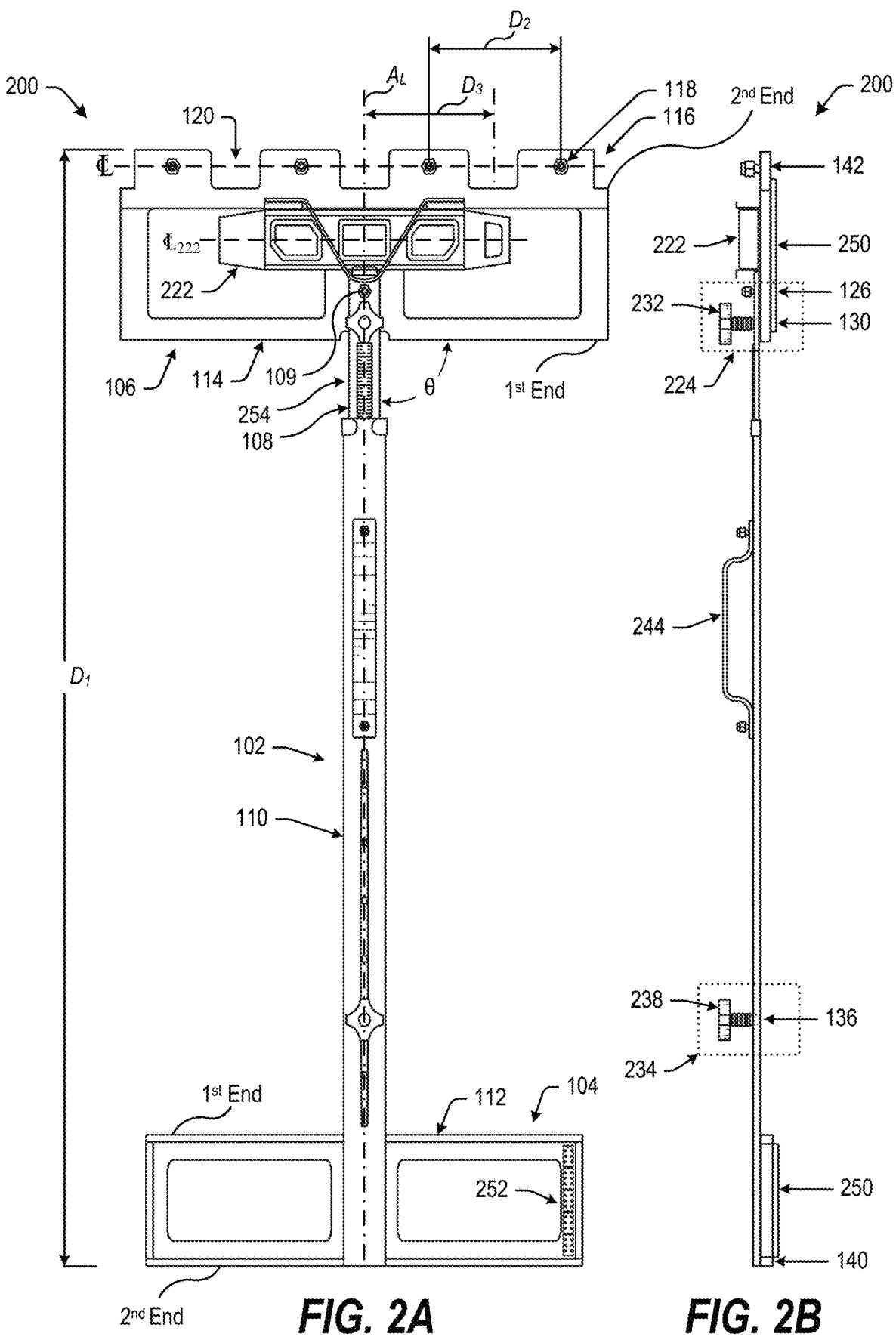
*FIG. 2A*        *FIG. 2B*

200

₵

118

120

114          116

106          2nd End

222

₵₂₂₂

109

232

224

254          1st End

244

102

110

234

238

112          104

1st End

252

2nd End

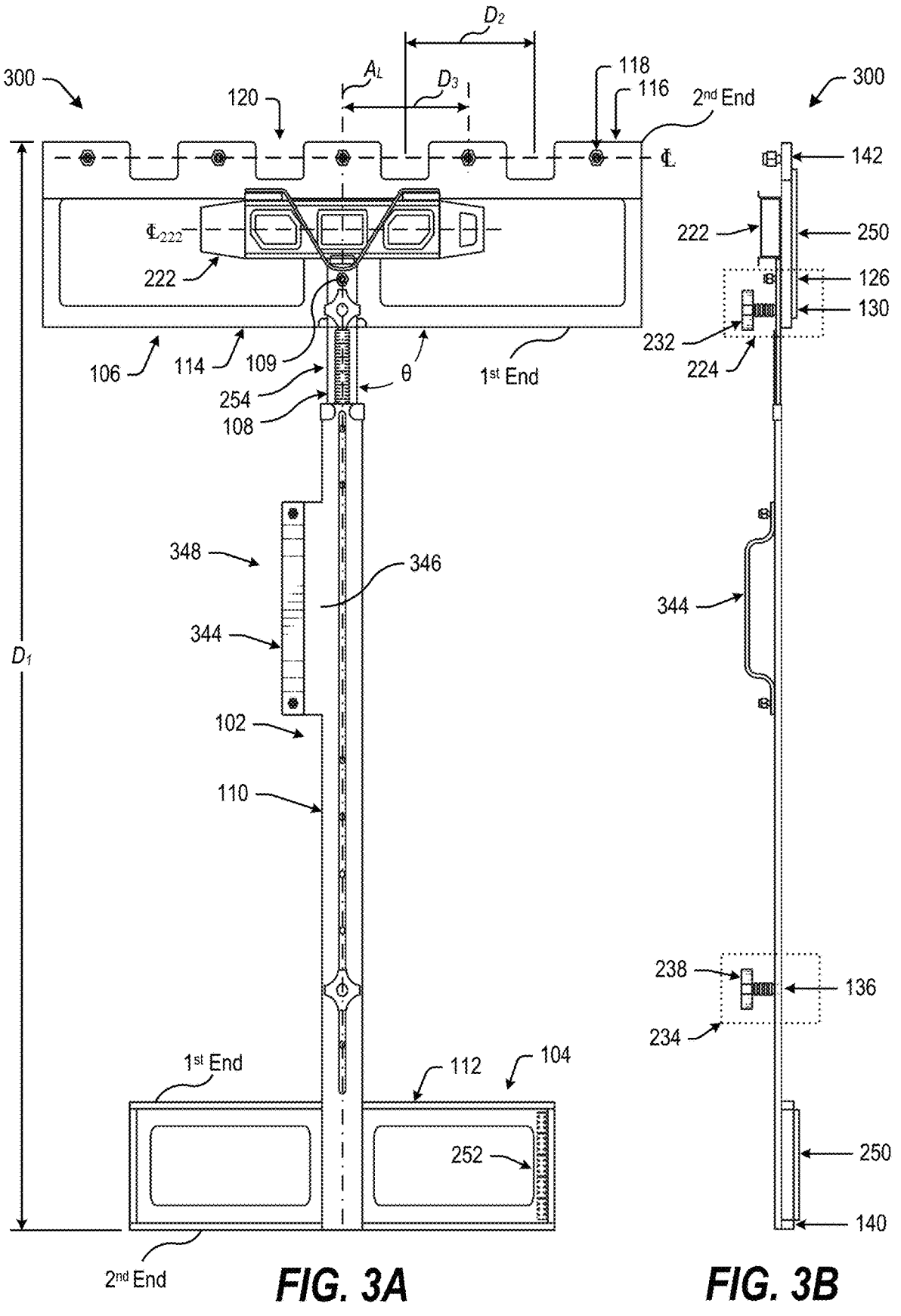
*FIG. 3A*           *FIG. 3B*

400

POSITION A FOOT PLATE AND A HEAD PLATE OF AN
ADJUSTABLE INSTALLATION DEVICE AGAINST A SURFACE
402

ADJUST A DISTANCE BETWEEN THE FOOT PLATE AND
THE HEAD PLATE
404

FIX THE FOOT PLATE AND THE HEAD PLATE IN PLACE RELATIVE
TO ONE ANOTHER
406

ROTATE THE HEAD PLATE RELATIVE TO THE FOOT PLATE TO
ALIGN A GUIDE HOLES CENTERLINE ON THE HEAD PLATE WITH A
DEFINED PLANE
408

ADJUSTABLE MIRROR INSTALLATION DEVICE

CROSS REFERENCE TO RELATED APPLICATIONS

This application claims the benefit of and priority to U.S. Provisional Application Ser. No. 63/582,030, filed Sep. 12, 2023, titled "ADJUSTABLE MIRROR INSTALLATION DEVICE," the entire contents of which are hereby incorporated herein by reference.

BACKGROUND

Various objects or structures can be mounted on walls or other vertical structures. For example, a variety of objects and structures can be mounted on a wall using a mounting assembly such as a French cleat or an equivalent mounting unit. Such mounting assemblies include a wall-side bracket and an object-side bracket. Traditionally, a wall-side bracket is mounted using various measurements and a level. This process is susceptible to non-level hanging as well as incorrectly spacing screws or other attachment mechanisms.

BRIEF SUMMARY

The present disclosure is directed to embodiments of an adjustable installation device and methodology for operating the same that can be implemented to hang various objects on a surface. The adjustable installation device can be embodied as a multi-tool device including different combinations of various mounting devices or systems such as, for example, a template or jig, an alignment device, and a distance measuring system, among other mounting tools. The adjustable installation device can be implemented to hang various objects such as mirrors, art, canvas, photographs, tapestries, frames (e.g., framed mirrors, art, canvas, photographs, tapestries, etc.), wall décor, shelves, or cabinets, among other objects, on walls or other vertical or approximately vertical structures.

Aspects and advantages of embodiments of the present disclosure will be set forth in part in the following description or can be learned from the description or through practice of the embodiments. Other aspects and advantages of embodiments of the present disclosure will become better understood with reference to the appended claims and the accompanying drawings, all of which are incorporated in and constitute a part of this specification. The drawings illustrate example embodiments of the present disclosure and, together with the description, serve to explain the related concepts of the present disclosure.

According to one example embodiment, an adjustable installation device includes a body section including a first track member slidably positioned within a second track member. The adjustable installation device further includes a foot section coupled to the second track member. The adjustable installation device further includes a head section rotatably coupled to the first track member at a pivot point that is located between a first end and a second end of the head section. The head section is at least partly rotatable about the pivot point. The head section includes a plurality of plates extending from the second end of the head section. The head section further includes a plurality of guide holes formed through the plurality of plates on a common centerline that extends along the second end of the head section and through a center of each of the plurality of guide holes. The head section further includes an alignment device operable to align the common centerline with a defined plane based on at least partial rotation of the head section about the pivot point. The first track member and the second track member are collectively operable to slide the foot section and the head section in opposite linear directions to adjust a distance between an end of the foot section and the common centerline.

According to another example embodiment, a method for mounting an object to a surface using an adjustable installation device includes positioning a surface-facing side of each of a foot plate and a head plate of the adjustable installation device against the surface. The method further includes moving the foot plate and the head plate in opposite linear directions along the surface to adjust a distance between the foot plate and the head plate. The method further includes fixing the foot plate and the head plate in place relative to one another at a defined distance between the foot plate and the head plate. The method further includes rotating the head plate relative to the foot plate to align a guide holes centerline on the head plate with a defined plane. The guide holes centerline extends across a center of each of a plurality of guide holes formed through the head plate.

According to another example embodiment, an adjustable installation device includes a first track member slidably positioned within a second track member. The adjustable installation device further includes a foot section coupled to the second track member. The adjustable installation device further includes a head section rotatably coupled to the first track member at a pivot point located on the head section. The head section is at least partly rotatable about the pivot point relative to the first track member. The head section includes a plurality of guide holes formed through the head section along a guide holes centerline that extends across a center of each of the plurality of guide holes. The head section further includes a planar alignment device coupled to the head section. The planar alignment device includes a planing reference line that is parallel to the guide holes centerline. The planar alignment device is operable to align each of the planing reference line and the guide holes centerline with a defined plane based on at least partial rotation of the head section about the pivot point relative to the first track member.

BRIEF DESCRIPTION OF THE DRAWINGS

Many aspects of the present disclosure can be better understood with reference to the following figures. The components in the figures are not necessarily to scale, with emphasis instead being placed upon clearly illustrating the concepts of the disclosure. Moreover, repeated use of reference characters or numerals in the figures is intended to represent the same or analogous features, elements, or operations across different figures. Repeated description of such repeated reference characters or numerals is omitted for brevity.

FIGS. 1A, 1B, and 1C respectively illustrate a front, side, and orthographic view of an example adjustable installation device according to at least one embodiment of the present disclosure.

FIGS. 2A, 2B, and 2C respectively illustrate a front, side, and orthographic view of another example adjustable installation device according to at least one embodiment of the present disclosure.

FIGS. 3A, 3B, and 3C respectively illustrate a front, side, and orthographic view of another example adjustable installation device according to at least one embodiment of the present disclosure.

DETAILED DESCRIPTION

Figure 1C:
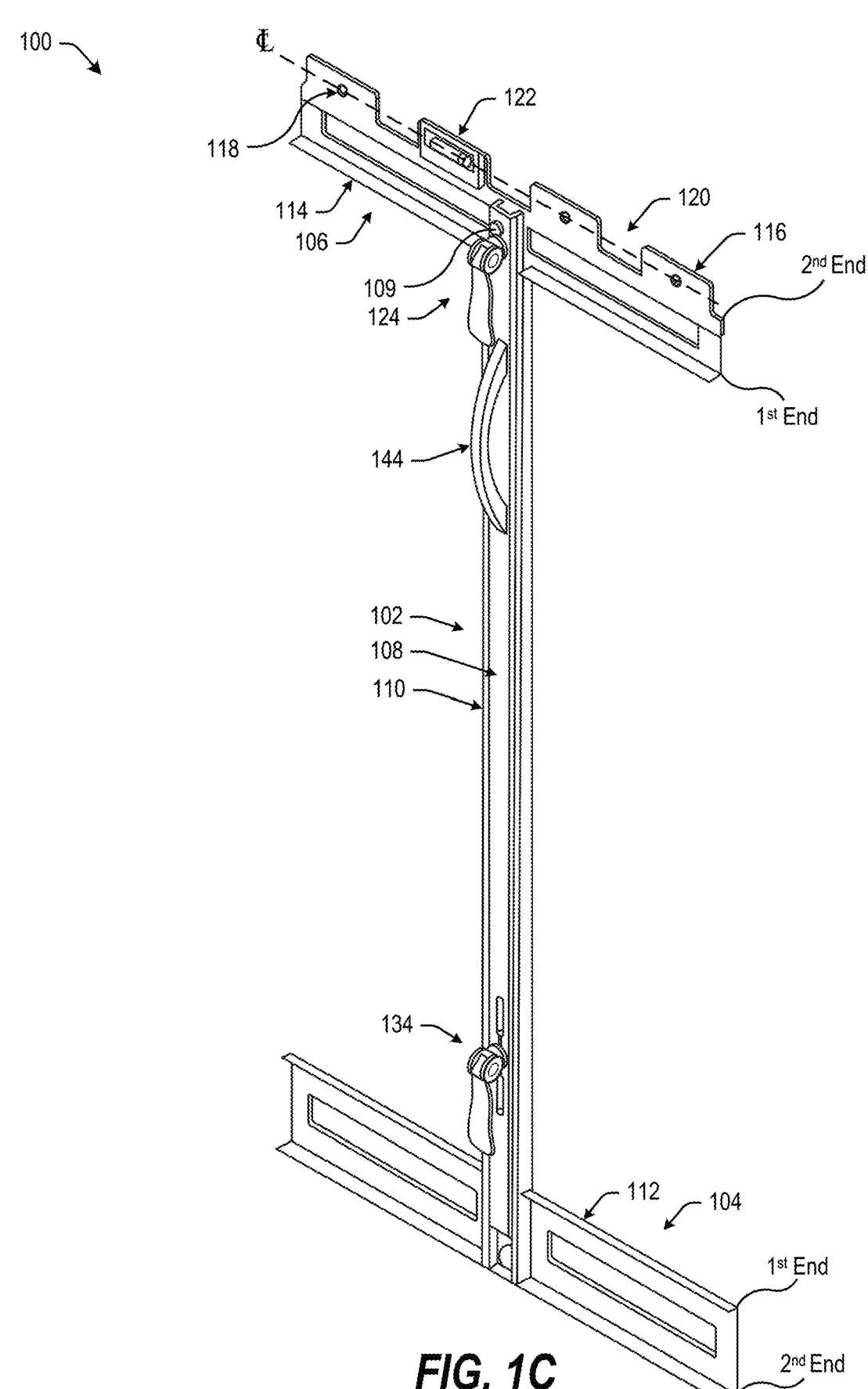

Described herein is an adjustable installation device for hanging various objects such as mirrors, art, canvas, photographs, tapestries, frames (e.g., framed mirrors, art, canvas, photographs, tapestries, etc.), wall décor, shelves, or cabinets, among other objects, on walls or other vertical or approximately vertical structures. The adjustable installation device of the present disclosure can be embodied and implemented as an adjustable wall hanging template or jig that can be used to mount an object(s) at a particular location(s) on a wall in a more precise and convenient manner compared to existing installation devices. In embodiments herein, the adjustable installation device may be embodied as a multi-tool device including different combinations of various mounting devices or systems such as, for example, a template or jig, an alignment device, and a distance measuring system, among other mounting tools. Compared to existing installation devices including multi-tool devices, the adjustable installation device described herein provides for more precise and convenient mounting of various objects including wall hardware in some cases, as it eliminates the individual and sequential use of separate mounting tools. Additionally, the adjustable installation device allows for concurrent operation, adjustment, and/or coupling of two or more of its components, thereby facilitating relatively rapid mounting of various objects in arbitrary or predefined locations when compared to existing installation devices including multi-tool devices.

In some examples, the adjustable installation device can be used to mount an object (e.g., a mirror or framed mirror) at an arbitrary location on a wall. In other examples, the adjustable installation device can be used to mount an object (e.g., a mirror or framed mirror) at a particular location on a wall that has been determined relative to one or more reference points. Examples of such reference points include the location of an adjacent wall, floor, ceiling, or trim, the location of another object (e.g., another mirror or framed mirror) that has already been mounted on the wall, another reference point, or any combination thereof.

One advantage of the adjustable installation device is that it can be used to accurately install several different objects on a wall according to a certain symmetrical or non-symmetrical arrangement. The adjustable wall hanging template and jig features of the adjustable installation device provide for more precise adherence to such a particular symmetrical or non-symmetrical arrangement relative to existing installation devices including multi-tool devices. Additionally, the relatively light-weight materials and easy-to-use components of the adjustable installation device provide improved device portability and operation aspects compared to existing installation devices. For example, the adjustable installation device and/or one or more components thereof may be fabricated and assembled using any number of materials including, but not limited to, plastic, metal (e.g., brass, aluminum, etc.), metal-alloy, polymer composite, or wood, among other materials. Further, the comparatively simple design of the adjustable installation device described herein allows for improved functionality and durability while also simplifying the fabrication and assembly of the device, thereby facilitating reduced production costs.

In several examples described herein and illustrated in the figures, the adjustable installation device is embodied and implemented as an adjustable framed mirror installation device for hanging framed mirrors, although the present disclosure is not so limited. The adjustable installation device described herein can be embodied and implemented, with or without modification to any example herein, as an adjustable installation device for hanging any of the aforementioned wall mounted objects or structures. All such variations are envisioned and included within the scope of the present disclosure.

FIGS. 1A, 1B, and 1C illustrate a front, side, and orthographic view of an example adjustable installation device 100, respectively, according to at least one embodiment of the present disclosure. The adjustable installation device 100 can be embodied and implemented as an adjustable wall hanging template or jig that can be used to mount an object(s) at a particular location(s) on a wall or other vertical or approximately vertical structure in a more precise and convenient manner compared to existing installation devices.

In the example shown in FIGS. 1A, 1B, and 1C, the adjustable installation device 100 is embodied as a multi-tool device including an illustrative combination of certain mounting devices and systems described further herein. Compared to existing installation devices including multi-tool devices, the adjustable installation device 100 provides for more precise and convenient mounting of various objects including wall hardware in some cases, as it eliminates the individual and sequential use of separate mounting tools. Additionally, the adjustable installation device 100 allows for concurrent operation, adjustment, and/or coupling of two or more of its components, thereby facilitating relatively rapid mounting of various objects in arbitrary or predefined locations when compared to existing installation devices including multi-tool devices.

In one example, the adjustable installation device 100 can be used to mount an object (e.g., a mirror, framed mirror, frame, canvas, television, television mount, or like object) at an arbitrary location on a wall. In another example, the adjustable installation device 100 can be used to mount an object (e.g., a mirror, framed mirror, frame, canvas, television, television mount, or like object) at a particular location on a wall. In this example, the particular location where the object is to be mounted can be pre-defined relative to one or more reference points. Examples of such reference points include, but are not limited to, the location of an adjacent wall, floor, ceiling, or trim, the location of another object (e.g., another mirror) that has already been mounted on the wall, another reference point, or any combination thereof.

With reference to the example depicted in FIGS. 1A, 1B, and 1C, collectively, the adjustable installation device 100 includes a body section 102, a foot section 104, and a head section 106. The body section 102 includes a first track member 108 slidably positioned within a second track member 110 (collectively, "track members 108, 110"). In this example, the first track member 108 is embodied and implemented as an inner T-track and the second track member 110 is embodied and implemented as an outer T-track, although other slidable or telescoping components may be relied upon in some cases for one or both of the track members 108, 110. The track members 108, 110 are collectively operable to slide the foot section 104 and the head section 106 in opposite linear directions along a longitudinal axis $A_L$ of the body section 102 to adjust a distance $D_1$ between respective ends of the foot section 104 and the head section 106. The adjustable installation device 100 can include one or more drivers or drive train systems coupled to either or both of the track members 108, 110 in some embodiments. One or both of the track members 108, 110 may be driven by at least one of an electric driver (e.g., a motor drive train), a pneumatic driver (e.g., positive displacement drive train), a mechanical driver (e.g., gears, pulleys, hand-crank), or by another type of driver in examples where one or more of such drivers are coupled to either or both of the track members 108, 110.

The foot section 104 includes a foot plate 112 coupled to a first end of the second track member 110. In the example depicted in FIGS. 1A, 1B, and 1C, a first end and a second end of the foot plate 112 are coupled to the first end of the second track member 110 at least partly by way of a fastener such as, for instance, a bolt and nut arrangement, although in some cases, another coupling mechanism may be relied upon.

The head section 106 includes a head plate 114 that is rotatably coupled to a first end the first track member 108. In this example, the head plate 114 is rotatably coupled to the first end of the first track member 108 at a pivot point 109 that is located between a first end and a second end of the head plate 114. In this example, the head plate 114 and the head section 106 are at least partly rotatable about the pivot point 109. The head section 106 further includes one or more plates 116 (or "plates 116") extending from the second end of the head plate 114. The head section 106 also includes one or more guide holes 118 (or "guide holes 118"). In some implementations, the guide holes 118 are formed through the plates 116 on a common, shared centerline (℄) that extends along the second end of the head plate 114 and through a center of each of the guide holes 118. Each of the guide holes 118 is configured to receive and guide, for instance, a drill bit, a punch, a nail, a pencil marking, or another component. The head section 106 further includes recessed regions 120 formed between pairs of individual plates 116 along the second end of the head plate 114. Only a single plate 116, a single guide hole 118, and a single recessed region 120 are denoted in FIGS. 1A, 1B, and 1C for clarity, but it is understood that other numbers of the same may be provided.

In the example illustrated in FIGS. 1A, 1B, and 1C, the centers of individual plates 116 are spaced a distance $D_2$ apart from one another along the second end of the head plate 114. In some examples, individual plates 116 are equally spaced apart from one another along the second end of the head plate 114. In other examples, at least one pair of individual plates of the plates 116 are spaced apart from one another at a distance that is different from a distance separating at least one other pair of individual plates of the plates 116. In one example, the centers of individual plates of the plates 116 are spaced 4 inches (10.16 cm) apart from one another along the second end of the head plate 114, although it is understood that other dimensions can be employed.

In the example illustrated in FIGS. 1A, 1B, and 1C, the centers of individual guide holes 118 are also spaced a distance $D_2$ apart from one another along the second end of the head plate 114. In some examples, individual guide holes 118 are equally spaced apart from one another along the second end of the head plate 114. In other examples, at least one pair of individual guide holes of the guide holes 118 are spaced apart from one another at a distance that is different from a distance separating at least one other pair of individual guide holes of the guide holes 118. In one example, the centers of individual guide holes of the guide holes 118 are spaced 4 inches (10.16 cm) apart from one another along the second end of the head plate 114.

In the example illustrated in FIGS. 1A, 1B, and 1C, the centers of individual recessed regions 120 are spaced a distance $D_3$ apart from one another along the second end of the head plate 114. In some examples, individual recessed regions 120 are equally spaced apart from one another along the second end of the head plate 114. In other examples, at least one pair of individual recessed regions 120 are spaced apart from one another at a distance that is different from a distance separating at least one other pair of individual recessed regions 120. In one example, the centers of individual recessed regions 120 are spaced 4 inches apart from one another along the second end of the head plate 114.

In the example depicted in FIGS. 1A, 1B, and 1C, the head section 106 further includes a planar alignment device 122 coupled to the head plate 114. In this example, the planar alignment device 122 is coupled to one of the plates 116 extending from the head plate 114. In this example, the planar alignment device 122 is coupled to the plate 116 in an orientation that allows for at least one of a longitudinal centerline or planing reference line of the planar alignment device 122 to be aligned with and/or parallel to the common centerline ℄ passing through the centers of the guide holes 118. In other examples, the planar alignment device 122 may be coupled to another portion of the head section 106 or positioned in a different orientation than that shown in FIGS. 1A, 1B, and 1C. The planar alignment device 122 is operable to align its own longitudinal centerline or planing reference line and the common centerline ℄ with a defined plane based on at least partial rotation of the head plate 114 about the pivot point 109. In one example, the planar alignment device 122 is embodied and implemented as a level such as, for instance, a bubble level (also referred to as a "spirit level") that is operable to align its own longitudinal centerline or planing reference line and the common centerline ℄ of the guide holes 118 with a horizontal plane based on at least partial rotation of the head plate 114 about the pivot point 109. As referenced herein, a "planing reference line" is a reference line that is inherent to a planar alignment device and indicates when a centerline of the device is positioned in a defined plane (e.g., a certain horizontal or vertical plane).

To rotate the head plate 114 at least partially about the pivot point 109, the head plate 114 is rotatably coupled to the first track member 108 at the pivot point 109 by way of a rotatable connector and clamping unit 124. In various examples, the rotatable connector and clamping unit 124 is operable to allow the head plate 114 to rotate at least partly about the pivot point 109 relative to at least one of the body section 102, the foot section 104, the first track member 108, the second track member 110, or the foot plate 112. In these examples, the rotatable connector and clamping unit 124 is further operable to fix the head plate 114 and the head section 106 in a defined angular position about the pivot point 109 relative to at least one of the body section 102, the foot section 104, the first track member 108, the second track member 110, or the foot plate 112.

In the example illustrated in FIGS. 1A, 1B, and 1C, the rotatable connector and clamping unit 124 includes a first threaded stud 126 projecting from the head plate 114 and through a pivot aperture (not illustrated) formed through the first track member 108. The first threaded stud 126 has a longitudinal axis that aligns with and extends through the pivot point 109 at a right angle in this example. The rotatable connector and clamping unit 124 in the example shown also includes a lock nut 128 threaded on the first threaded stud 126. In this example, the rotatable connector and clamping unit 124 further includes a threaded clamping handle 132 threaded on a second threaded stud 130 projecting from the head plate 114 and through a slot (not illustrated) that is formed through the first track member 108. In this example, the first threaded stud 126 and the lock nut 128 are collectively operable to allow the head section 106 and the head plate 114 to rotate at least partly about the pivot point 109 relative to at least one of the body section 102, the foot section 104, the first track member 108, the second track member 110, or the foot plate 112. Additionally, in this example, the second threaded stud 130 and the threaded clamping handle 132 are collectively operable to fix the head section 106 in a defined angular position about the pivot point 109 relative to at least one of the body section 102, the foot section 104, the first track member 108, the second track member 110, or the foot plate 112.

In the example shown, the body section 102 further includes a slidable connector and clamping unit 134 that is operable to fix the first track member 108 in a defined linear position relative to the second track member 110. For instance, the slidable connector and clamping unit 134 is operable to fix the first track member 108 in a defined linear position located along the longitudinal axis $A_L$ of the body section 102.

In the example depicted in FIGS. 1A, 1B, and 1C, the slidable connector and clamping unit 134 includes a threaded stud 136 projecting from the first track member 108 and through a slot that is formed through and along the second track member 110. In this example, the slidable connector and clamping unit 134 further includes a threaded clamping handle 138 threaded on the threaded stud 136. The threaded stud 136 and the threaded clamping handle 138 are collectively operable to fix the first track member 108 in a defined linear position along the longitudinal axis $A_L$ of the body section 102 such that location of the first track member 108 is fixed relative to the second track member 110. The first track member 108, the second track member 110, and the slidable connector and clamping unit 134 are collectively operable to slide the foot section 104 and the head section 106 in opposite linear directions along the longitudinal axis $A_L$. In this way, the first track member 108, the second track member 110, and the threaded clamping handle 138 are collectively operable to adjust the distance $D_1$ between respective ends of the foot section 104 and the head section 106. Similarly, the first track member 108, the second track member 110, and the threaded clamping handle 138 are collectively operable to adjust a distance between the second end of the foot section 104 and the common centerline $\mathcal{C}_L$.

In the example shown, a surface 140 of the foot plate 112 and a surface 142 of the head plate 114 are both located on a same side of the adjustable installation device 100. The surface 140 of the foot plate 112 and the surface 142 of the head plate 114 both face in a same direction. The surface 140 of the foot plate 112 and the surface 142 of the head plate 114 are both positioned in a common, shared plane (e.g., a vertical plane that is parallel to a wall or other vertical structure on which an object is to be mounted). In the example shown, the adjustable installation device 100 can further include a handle 144 coupled to at least one of the body section 102, the first track member 108, or the second track member 110.

Although not illustrated in the example depicted in FIGS. 1A, 1B, and 1C, in some cases the adjustable installation device 100 may further include one or more pads (e.g., foam pads, rubber pads) respectively coupled to the surface 140 of the foot plate 112 and to the surface 142 of the head plate 114. In addition, although not illustrated in the example depicted in FIGS. 1A, 1B, and 1C, in some cases the adjustable installation device 100 may further include at least one distance measuring system for measuring linear and/or angular distances (e.g., rotational distances). For instance, the adjustable installation device 100 can include at least one ruler, protractor, or other distance measuring system coupled to or denoted on at least one of the foot plate 112, the head plate 114, the first track member 108, the second track member 110, or another component of the adjustable installation device 100. In at least one example, such a linear and/or angular distance measuring system can be coupled to, printed on, or etched into one or more surfaces of any or all of such components of the adjustable installation device 100.

Figure 2C:

FIGS. 2A, 2B, and 2C respectively illustrate a front, side, and orthographic view of another example adjustable installation device 200 according to at least one embodiment of the present disclosure. The adjustable installation device 200 described herein and illustrated in FIGS. 2A to 2C is an example alternative embodiment of the adjustable installation device 100 described above and illustrated in FIGS. 1A, 1B, and 1C. The adjustable installation device 200 includes a rotatable connector and clamping unit 224 instead of the rotatable connector and clamping unit 124 of the adjustable installation device 100. The rotatable connector and clamping unit 224 of the adjustable installation device 200 is an example alternative embodiment of the rotatable connector and clamping unit 124 of the adjustable installation device 100. The rotatable connector and clamping unit 224 includes a threaded hand knob 232 threaded on the second threaded stud 130 instead of the threaded clamping handle 132. In the example shown in FIGS. 2A to 2C, the second threaded stud 130 and the threaded hand knob 232 are collectively operable to fix the head section 106 and the head plate 114 in a defined angular position about the pivot point 109 relative to at least one of the body section 102, the foot section 104, the first track member 108, the second track member 110, or the foot plate 112.

The adjustable installation device 200 includes a slidable connector and clamping unit 234 instead of the slidable connector and clamping unit 134 of the adjustable installation device 100. The slidable connector and clamping unit 234 of the adjustable installation device 200 is an example alternative embodiment of the slidable connector and clamping unit 134 of the adjustable installation device 100. The slidable connector and clamping unit 234 includes a threaded hand knob 238 threaded on the threaded stud 136 instead of the threaded clamping handle 138. In the example shown in FIGS. 2A to 2C, the threaded stud 136 and the threaded hand knob 238 are collectively operable to fix the first track member 108 in a defined linear position relative to the second track member 110 along the longitudinal axis $A_L$ of the body section 102.

The adjustable installation device 200 includes a planar alignment device 222 instead of the planar alignment device 122 of the adjustable installation device 100. The planar alignment device 222 of the adjustable installation device 200 is an example alternative embodiment of the planar alignment device 122 of the adjustable installation device 100. The planar alignment device 222 is positioned between the first end and the second end of the head plate 114 instead of being located on one of the plates 116 extending from the second end of the head plate 114. Additionally, the planar alignment device 222 is coupled to the head plate 114 in an orientation that allows for at least one of a longitudinal centerline or planing reference line of the planar alignment device 222 to be offset from and parallel to the common centerline ₵ of the guide holes 118 instead of being aligned with and parallel to the common centerline ₵. The planar alignment device 222 is operable to align its own longitudinal centerline or planing reference line and the common centerline ₵ with a defined plane based on at least partial rotation of the head plate 114 about the pivot point 109. In one example, the planar alignment device 222 is embodied and implemented as a level such as, for instance, a bubble level (also referred to as a "spirit level") that is operable to align its own longitudinal centerline or planing reference line and the common centerline ₵ of the guide holes 118 with a horizontal plane based on at least partial rotation of the head plate 114 about the pivot point 109.

The adjustable installation device 200 includes one or more pads 250 (e.g., foam pads, rubber pads) respectively coupled to the surface 140 of the foot plate 112 and to the surface 142 of the head plate 114. The adjustable installation device 200 includes a handle 244 coupled to at least one of the body section 102, the first track member 108, or the second track member 110.

The adjustable installation device 200 includes distance measuring systems 252, 254 for measuring linear distances. The distance measuring systems 252, 254 are each embodied and implemented as a ruler (e.g., a measuring tape) in the example shown. The distance measuring system 252 is coupled to or formed on (e.g., etched, printed) a surface of the foot plate 112. The distance measuring system 254 is coupled to or formed on (e.g., etched, printed) a surface of the first track member 108. The distance measuring system 254 is operable for measuring various linear positions of the track members 108, 110 relative to one another along the longitudinal axis $A_L$ of the body section 102. The distance measuring system 254 is also operable for adjusting the linear positions of the track members 108, 110 relative to one another along the longitudinal axis $A_L$ of the body section 102, to facilitate adjustment of the distance $D_1$ between respective ends of the foot plate 112 and the head plate 114.

Figure 3C:
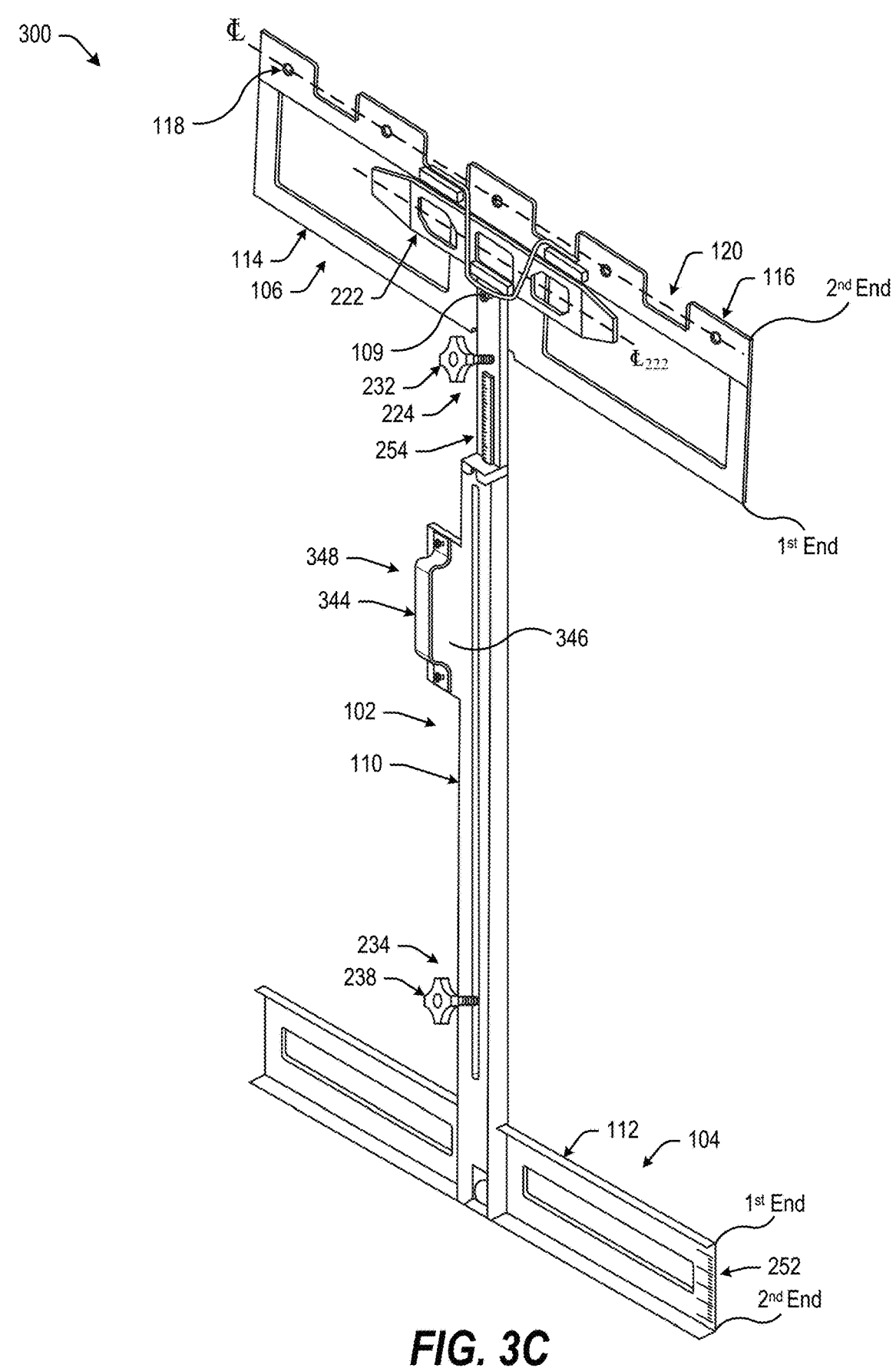

FIGS. 3A, 3B, and 3C respectively illustrate a front, side, and orthographic view of another example adjustable installation device 300 according to at least one embodiment of the present disclosure. The adjustable installation device 300 described herein and illustrated in FIGS. 3A to 3C is an example alternative embodiment of the adjustable installation device 200 described above and illustrated in FIGS. 2A, 2B, and 2C. The adjustable installation device 300 includes a handle unit 348 instead of the handle 144. The handle unit 348 in the example shown includes a handle support plate 346 extending from a side of the second track member 110 and a handle 344 coupled to the handle support plate 346. The handle support plate 346 extends from the side of the second track member 110 in a plane that is parallel to a plane in which at least one of the surface 140 of the foot plate 112 or the surface 142 of the head plate 114 is positioned. In some examples, the handle support plate 346 can extend from the side of the second track member 110 in the same plane in which at least one of the surface 140 of the foot plate 112 or the surface 142 of the head plate 114 is positioned. The handle 344 is coupled to the handle support plate 346 such that a centerline of the handle 344 is offset from and parallel to a centerline (e.g., the longitudinal axis $A_L$) of at least one of the first track member 108 or the second track member 110 in the example shown. In other examples, the handle 344 can be coupled to the handle support plate 346 in a different orientation compared to that shown in FIGS. 3A to 3C.

The head plate 114 of the adjustable installation device 300 includes five guide holes 118 compared to four included on the head plate 114 of the adjustable installation device 200. The head plate 114 of the adjustable installation device 300 includes four recessed regions 120 compared to three included on the head plate 114 of the adjustable installation device 200.

Figure 4:
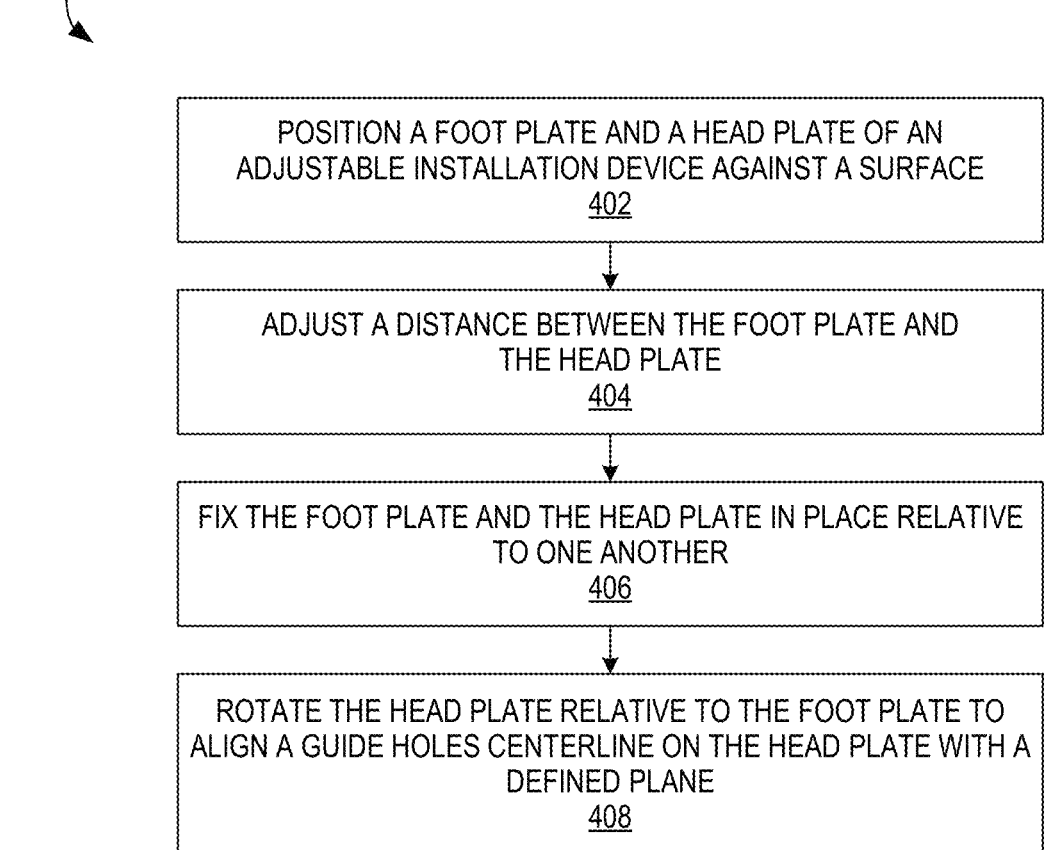
FIG. 4 illustrates a flow diagram of an example method for mounting an object to a surface using the adjustable installation device of FIGS. 1A, 1B, and 1C according to at least one embodiment of the present disclosure.

FIG. 4 illustrates a flow diagram of an example method 400 for mounting an object to a surface using an adjustable installation device according to at least one embodiment of the present disclosure. The method 400 can be implemented using any of the adjustable installation devices 100, 200, 300 to mount an object at a particular location on a wall or other vertical or approximately vertical structure.

At 402, the method 400 includes positioning a surface-facing side of each of a foot plate and a head plate of an adjustable installation device against a surface. For instance, at 402 the method 400 can include positioning the surface 140 of the foot plate 112 and the surface 142 of the head plate 114 of any of the adjustable installation devices 100, 200, 300 and/or one or more pads 250 coupled to such surfaces against a wall surface.

At 404, the method 400 includes moving the foot plate and the head plate in opposite linear directions along the surface to adjust a distance between the foot plate and the head plate. For instance, at 404 the method 400 can include moving the first track member 108 of any of the adjustable installation devices 100, 200, 300 in an opposite linear direction along the longitudinal axis $A_L$ relative to the second track member 110 to adjust a linear distance between the foot plate 112 and the head plate 114. The foot plate 112 can be positioned on top of a floor, base trim, or like component of a room in some examples.

At 406, the method 400 includes fixing the foot plate and the head plate in place relative to one another at a defined distance between the foot plate and the head plate. For instance, at 406 the method 400 can include fixing the first track member 108 and the second track member 110 in place relative to one another at a defined linear distance between the second end of the foot plate 112 and the common centerline ₵ of the guide holes 118. The track members 108, 110 can be fixed in place relative to one another at a defined linear distance in one example using the distance measuring system 254 to determine the defined linear distance and using the slidable connector and clamping unit 134 or 234 to fix the track members 108, 110 in place at such a distance.

At 408, the method 400 includes rotating the head plate relative to the foot plate to align a guide holes centerline on the head plate with a defined plane. For instance, at 408 the method 400 can include rotating the head plate 114 about the pivot point 109 relative to the foot plate 112 to align the common centerline ₵ of the guide holes 118 on the head plate 114 with a defined horizontal plane. In one example, the method 400 at 408 can include aligning the longitudinal centerline or planing reference line of the planar alignment device 122 with a certain horizontal plane based on such rotation of the head plate 114. In this example, the method 400 at 408 can further include aligning the common centerline ₵ of the guide holes 118 with such a horizontal plane based at least in part on aligning the longitudinal centerline or planing reference line of the planar alignment device 122 with the horizontal plane. The method 400 at 408 can further include fixing the head plate 114 and the first track member 108 in place relative to one another at a defined angular position in this example based at least in part on aligning the common centerline ₵ of the guide holes 118 with such a horizontal plane. The head plate 114 and the first track member 108 can be fixed in place relative to one another at a defined angle θ in one example using the rotatable connector and clamping unit 124 or 224.

In some examples the method 400 can further include performing a hardware installation process to mount an object support component on the surface using at least one of a plurality of guide holes formed through the head plate along the guide holes centerline. For instance, the method 400 can further include performing a hardware installation process to mount an object support component on the surface using any or all of the guide holes 118. In various examples, performing such a hardware installation process can include at least one of marking (e.g., using a pencil or pen) the surface at a location corresponding to a center of one of the guide holes 118, drilling (e.g., using a drill and drill bit) a hole in the surface at the location corresponding to the center of one of the guide holes 118, or installing (e.g., using a hammer, screwdriver, or drill) a nail or a screw in the surface at the location corresponding to the center of one of the guide holes 118.

Disjunctive language, such as the phrase "at least one of X, Y, or Z," unless specifically stated otherwise, is to be understood with the context as used in general to present that an item, term, or the like, can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present. As referenced herein in the context of quantity, the terms "a" or "an" are intended to mean "at least one" and are not intended to imply "one and only one."

As referred to herein, the terms "include," "includes," and "including" are intended to be inclusive in a manner similar to the term "comprising." As referenced herein, the terms "or" and "and/or" are generally intended to be inclusive, that is (i.e.), "A or B" or "A and/or B" are each intended to mean "A or B or both." As referred to herein, the terms "first," "second," "third," and so on, can be used interchangeably to distinguish one component or entity from another and are not intended to signify location, functionality, or importance of the individual components or entities. As referenced herein, the terms "couple," "couples," "coupled," and/or "coupling" refer to chemical coupling (e.g., chemical bonding), communicative coupling, electrical and/or electromagnetic coupling (e.g., capacitive coupling, inductive coupling, direct and/or connected coupling), mechanical coupling, operative coupling, optical coupling, and/or physical coupling.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

The invention claimed is:

1. An adjustable installation device, comprising:
a body section comprising a first track member slidably positioned within a second track member;
a foot section coupled to the second track member; and a head section rotatably coupled to the first track member at a pivot point that is located between a first end and a second end of the head section, the head section being at least partly rotatable about the pivot point, the head section comprising:
a plurality of plates extending from the second end of the head section;
a plurality of guide holes formed through the plurality of plates on a common centerline that extends along the second end of the head section and through a center of each of the plurality of guide holes; and
an alignment device operable to align the common centerline with a defined plane based on at least partial rotation of the head section about the pivot point,
wherein the first track member and the second track member are collectively operable to slide the foot section and the head section in opposite linear directions to adjust a distance between an end of the foot section and the common centerline.

2. The adjustable installation device of claim 1, wherein individual ones of the plurality of guide holes are equally spaced apart from one another along the second end of the head section.

3. The adjustable installation device of claim 1, wherein the head section is rotatably coupled to the first track member at the pivot point by way of a rotatable connector and clamping unit, the rotatable connector and clamping unit being operable to allow the head section to rotate at least partly about the pivot point relative to at least one of the first track member or the foot section.

4. The adjustable installation device of claim 3, wherein the rotatable connector and clamping unit is further operable to fix the head section in a defined angular position about the pivot point relative to at least one of the first track member or the foot section.

5. The adjustable installation device of claim 1, wherein the body section further comprises a slidable connector and clamping unit that is operable to fix the first track member in a defined linear position relative to the second track member.

6. The adjustable installation device of claim 1, wherein the alignment device comprises a level coupled to at least one plate of the plurality of plates, and wherein a planing reference line of the alignment device is aligned with or parallel to the common centerline.

7. The adjustable installation device of claim 1, wherein a surface of the foot section and a surface of the head section are both located on a same side of the adjustable installation device, wherein the surface of the foot section and the surface of the head section both face in a same direction, and wherein the surface of the foot section and the surface of the head section are both positioned in a common plane.

8. The adjustable installation device of claim 1, wherein at least one of the foot section, the body section, the first track member, the second track member, or the head section comprise a distance measuring system.

9. An adjustable installation device, comprising:
a first track member slidably positioned within a second track member;
a foot section coupled to the second track member; and
a head section rotatably coupled to the first track member at a pivot point located on the head section, the head section being at least partly rotatable about the pivot point relative to the first track member, the head section comprising:

a plurality of guide holes formed through the head section along a guide holes centerline that extends across a center of each of the plurality of guide holes; and a planar alignment device coupled to the head section, the planar alignment device comprising a planing reference line that is parallel to the guide holes centerline, wherein the planar alignment device is operable to align each of the planing reference line and the guide holes centerline with a defined plane based on at least partial rotation of the head section about the pivot point relative to the first track member.

10. The adjustable installation device of claim 9, wherein individual ones of the plurality of guide holes are equally spaced apart from one another along the head section.

11. The adjustable installation device of claim 9, wherein the head section is rotatably coupled to the first track member at the pivot point by way of a rotatable connector and clamping unit, the rotatable connector and clamping unit being operable to allow the head section to rotate at least partly about the pivot point relative to at least one of the first track member or the foot section.

12. The adjustable installation device of claim 11, wherein the rotatable connector and clamping unit is further operable to fix the head section in the defined angular position about the pivot point relative to at least one of the first track member or the foot section.

13. The adjustable installation device of claim 9, further comprising:

a slidable connector and clamping unit coupled to at least one of the first track member or the second track member, the slidable connector and clamping unit being operable to fix the first track member in a defined linear position relative to the second track member.

14. The adjustable installation device of claim 9, wherein the planar alignment device comprises a level that is operable to align the guide holes centerline with the defined plane based on at least partial rotation of the head section about the pivot point relative to at least one of the first track member or the foot section.

\* \* \* \* \*